(12) United States Patent
Daranyi et al.

(10) Patent No.: US 10,305,275 B2
(45) Date of Patent: May 28, 2019

(54) DATA INTERFACE WITH OVERVOLTAGE PROTECTION FOR TWO-WAY DIGITAL CONTROL BUS SYSTEM

(71) Applicant: General Electric Company, Schenectady, NY (US)

(72) Inventors: Tamas Daranyi, Budapest (HU); Lajos Csibi, Budapest (HU); Levente Kovacs, Budapest (HU); Gabor Pap, Budapest (HU)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 245 days.

(21) Appl. No.: 15/201,682

(22) Filed: Jul. 5, 2016

(65) Prior Publication Data

US 2017/0237253 A1 Aug. 17, 2017

Related U.S. Application Data

(60) Provisional application No. 62/295,049, filed on Feb. 13, 2016.

(51) Int. Cl.
*H02H 9/04* (2006.01)
*H04B 1/04* (2006.01)
(Continued)

(52) U.S. Cl.
CPC ............ *H02H 9/045* (2013.01); *H02H 9/042* (2013.01); *H02H 11/006* (2013.01); *H04B 1/04* (2013.01); *H04B 1/16* (2013.01); *H05B 37/0254* (2013.01)

(58) Field of Classification Search
CPC ...... H02H 9/042; H02H 9/045; H02H 11/006; H05B 37/0254; H04B 1/04; H04B 1/16
(Continued)

(56) References Cited

U.S. PATENT DOCUMENTS

| 3,973,169 | A | * | 8/1976 | Titus | ........................ H02H 7/16 361/17 |
| 7,983,012 | B2 | | 7/2011 | Chitta | |
| 2015/0264759 | A1 | * | 9/2015 | Hatta | .................. H05B 33/0845 315/291 |

FOREIGN PATENT DOCUMENTS

| CN | 203104871 | 7/2013 |
| DE | 20 2012 011494 U1 | 1/2013 |

(Continued)

OTHER PUBLICATIONS

Machine Translation of Trepte German Patent Document DE102013017019 Apr. 16, 2015.*

(Continued)

*Primary Examiner* — Kevin J Comber
(74) *Attorney, Agent, or Firm* — Buckley, Maschoff & Talwalkar LLC

(57) ABSTRACT

A data interface with overvoltage protection circuitry includes a bus interface and power rectification stage configured to provide supply and return voltages for the data interface and overvoltage protection circuitry, a first power level overvoltage protection circuit, a second power level overvoltage protection circuit, a DALI endpoint power output port, a power supply for a DALI endpoint device drawing current from the power output port, a receiver configured to receive signals on the DALI bus, and, a transmitter configured to send signals on the DALI bus.

12 Claims, 5 Drawing Sheets

(51) Int. Cl.
*H04B 1/16* (2006.01)
*H02H 11/00* (2006.01)
*H05B 37/02* (2006.01)

(58) Field of Classification Search
USPC .......................................................... 361/91.1
See application file for complete search history.

(56) References Cited

FOREIGN PATENT DOCUMENTS

| | | |
|---|---|---|
| DE | 10 2013 017019 A1 | 4/2015 |
| EP | 1 872 629 A1 | 1/2008 |
| EP | 2412208 B1 | 2/2012 |
| EP | 2709227 A1 | 3/2014 |
| EP | 2 760 165 A2 | 7/2014 |
| WO | 2015/055290 A1 | 4/2015 |

OTHER PUBLICATIONS

International Search Report and Written Opinion issued in connection with corresponding PCT Application No. PCT/US2017/017711 dated May 9, 2017.

* cited by examiner

DATA INTERFACE WITH OVERVOLTAGE PROTECTION FOR TWO-WAY DIGITAL CONTROL BUS SYSTEM

CLAIM OF PRIORITY

This patent application claims the benefit of priority, under 35 U.S.C. § 119, to U.S. Provisional Patent Application Ser. No. 62/295,049, filed Feb. 13, 2016 titled "DATA INTERFACE WITH OVERVOLTAGE PROTECTION FOR TWO-WAY DIGITAL CONTROL BUS SYSTEM" the entire disclosure of which is incorporated herein by reference.

BACKGROUND

A Digital Addressable Lighting Interface (DALI) is a data and protocol standard for lighting and/or related equipment (e.g., ballasts, dimmers, photoelectric cells, transformers, motion detectors, etc.). DALI compatible equipment can be interconnected on a DALI bus, even if from different manufactures and of different lighting technologies.

A DALI network can include a controller and one or more lighting and/or related equipment devices having DALI interfaces. DALI requires a single pair of wires as the communication bus to all devices on the same DALI network. All devices connected to the network can be addressed by a broadcast message, or individual devices can be controlled with a unique bus address.

DESCRIPTION

An embodying data interface with overvoltage protection can be a DALI compliant interface for a DALI endpoint device (e.g., ballasts, dimmers, photo electric cells, transformers, motion detectors, etc.). The embodying interface is capable of tolerating the supply voltages (about 250 VAC and/or 500 VDC), with overvoltage protection from the bus terminals without time constraints. Current sinking characteristics of an embodying device can be tailored to provide internal power supplies of the endpoint device(s).

In accordance with embodiments, the data interface with overvoltage protection can include circuitry providing two-level protection against voltage spikes and/or transients caused by miswiring (e.g., accidentally being connected to main line voltage(s)) with either a non-DALI compatible (i.e., non-constant voltage/constant current) Safety Extra Low Voltage (SELV) supply or the main electrical supply. In accordance with embodiments, there are provided separate power supplies for a transmitter stage and controller circuitry for enhanced reliability. An embodying data interface circuit can be operated at a very low power consumption level to drive the transmitter stage; the data interface circuit can be drive by even a two-volt logic level system.

In accordance with embodiments, an embodying data interface is a DALI compliant interface circuit that is used in low power application, where no external power supply is available. The embodying interface itself needs very low power to operate. The device is powered from the same low voltage bus, and is capable of communicating across that bus. The embodying interface includes a two-level overvoltage protection that protects the interface and the application (including its entire circuitry (power supply, microcontroller, etc.) against miswiring, and/or overvoltage on the DALI bus. For reliability and stability the circuit can include separate bias supply for the two protection circuits.

Figure 1:
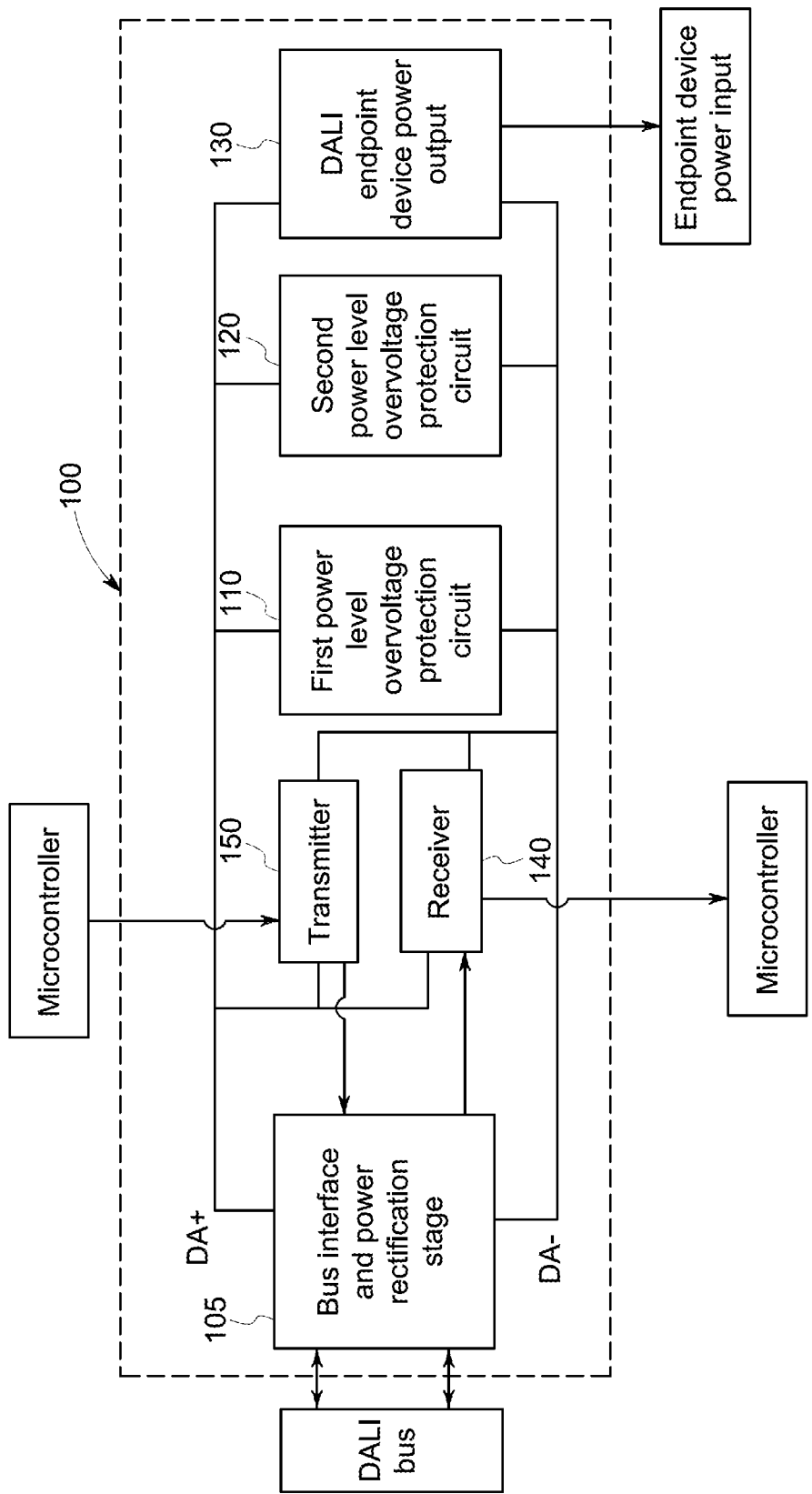
FIG. 1 depicts a block diagram of a data interface/overvoltage protection circuit in accordance with embodiments.

FIG. 1 depicts a block diagram of data interface/overvoltage protection circuit 100 in accordance with embodiments. Interface 100 connects to the two-wire DALI bus, and can send data/control messages provided from a microcontroller. Interface 100 can provide data/control messages received over the DALI bus to the same, or a different, microcontroller. Interface 100 can be operated at very low power by power provided across the DALI bus.

Interface 100 includes bus interface and power rectification stage 105. This stage conditions the DALI input voltage to provide supply and return voltages for the interface circuits. First power level overvoltage protection circuit 110 protects interface 100 from low level/high current overvoltage conditions on the DALI bus. Second power level overvoltage protection circuit 120 protects interface 100 from overvoltage conditions that can be caused by power main voltages inadvertently appearing on the DALI bus, perhaps from a short circuit on an endpoint device, or a miswiring. In accordance with embodiments, the overvoltage protection circuits 110, 120 of interface 100 are in parallel across rectified bus voltage lines DA+, DA−.

DALI endpoint device power output 130 provides a DC voltage to power the endpoint device (including the microcontroller(s)). Receiver 140 detects data/control signals on the DALI bus, and provides them to a microcontroller. Transmitter 150 can modulate data/control signal information from a microcontroller (the same or a different one), to send the information on the DALI bus. In accordance with embodiments, interface 100 includes a receive port connected to a transmit output port of a microcontroller (TX from MCU). Interface 100 also includes a transmit port connected to a data input port of the microcontroller (RX to MCU).

Figure 2:
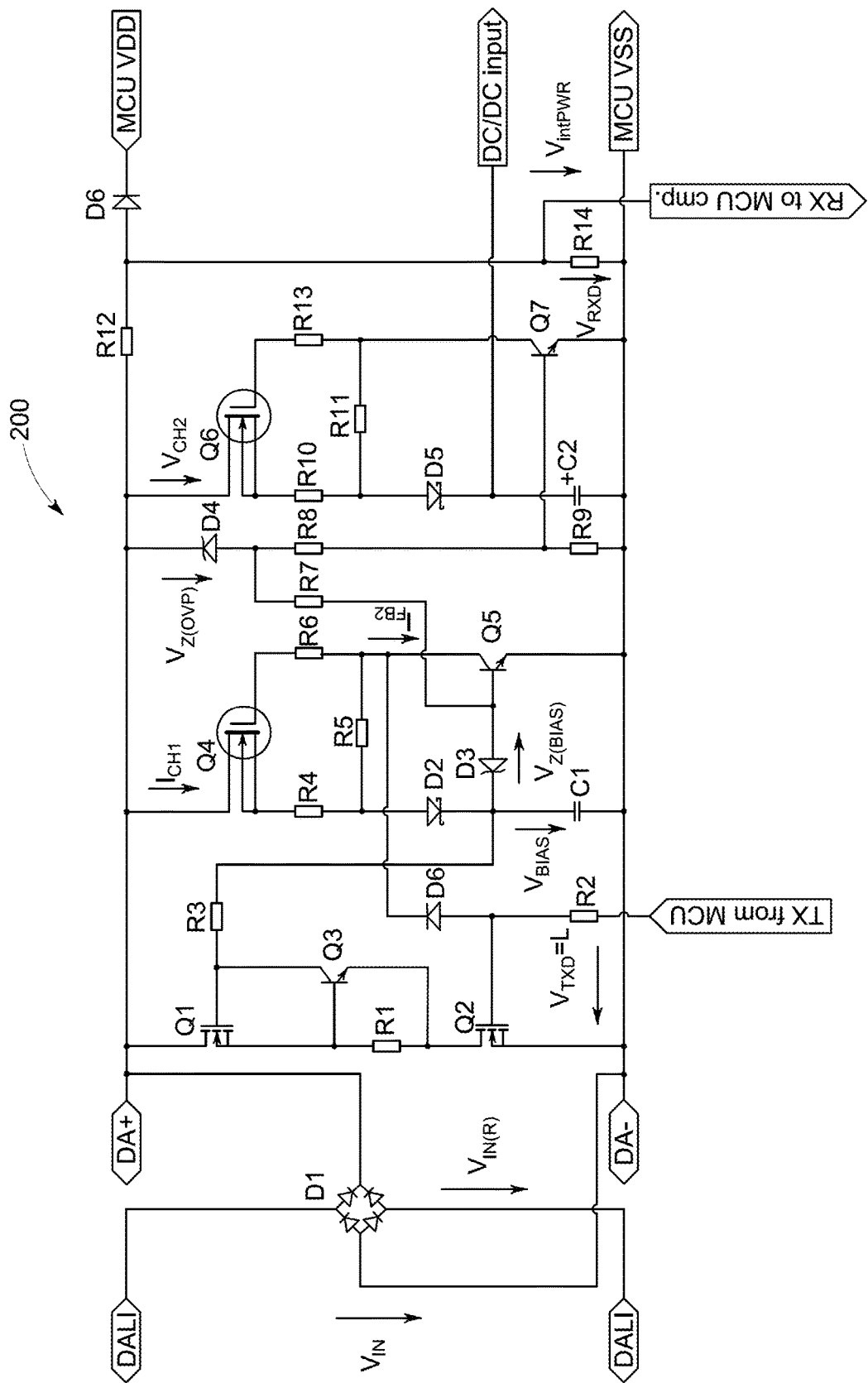
FIG. 2 depicts a schematic of a data interface/overvoltage protection circuit when in a power up and idle/receive data mode in accordance with embodiments.

Idle (Data Receiving) Mode:

FIG. 2 schematically depicts data interface/overvoltage protection circuit 200 when in a power up and idle/receive data mode in accordance with embodiments. Initially all of the energy storage components (biasing capacitor C1 and power supply buffer capacitor C2) are fully discharged, so transistor Q1 is in the cutoff region (zero biased) and the power supply of the microcontroller (MCU) is undervoltage locked. This preset status prevents the bus from inadvertent turn-on load spikes.

The power stage of the data transmitter is de facto a voltage controlled current sink. A low-voltage, high-current (logic range $V_{GS}$ driving element) nMOSFET drives the high voltage, high safe operating area, bus driver nMOSFET (current sinking and overload protecting/transient energy absorbing element) in its source electrode. The circuit can operate in four modes (two operational and two protected), as described below.

When powering up the DALI bus terminals, the rectified positive bus voltage ($V_{in(R)}$) presents on DA+ with respect to DA− lines. Transistor Q4 starts charging capacitor C1 via resistor R4 and diode D2, with the current $I_{CH1}$ (initially about 20 to 30 microamps), determined by resistor R4, and the gate threshold voltage ($V_{GS(th)}$) of transistor Q4 high $V_{DS}$ depletion nMOSFET. When the voltage on capacitor C1 reaches a predefined bias voltage ($V_{Z(BIAS)}+V_{BE(Q5)}$), current $I_{Z(BIAS)}$ flows through transistor Q5 base-emitter diode. Transistor Q5 activates and stabilizes the voltage ($V_{BIAS}$) on capacitor C1 by continuous control of its charging current through a negative current feedback ($I_{FB2}$). The other depletion mode nMOSFET, transistor Q6 starts charging capacitor C2 via resistor R10 and diode D5 with the current $I_{CH2}$ (limited to about 2 milliamps) determined by resistor R10 and transistor Q6 gate threshold until capacitor C2 is charged to the maximum voltage ($V_{intPWR}$) that is currently available on the rectified data bus ($V_{in(R)}$). As the bias and the internal power supply voltages set up the MCU initializes and the device remains in idle mode waiting for a command on the bus to arrive: Voltage $V_{TXD}$=logic L, and transistors Q2, Q1 are in cutoff region with negligible current flowing through their channels. The bus voltage is divided by resistors R12, R14, and is available for the RX data input port of the MCU.

Figure 3:
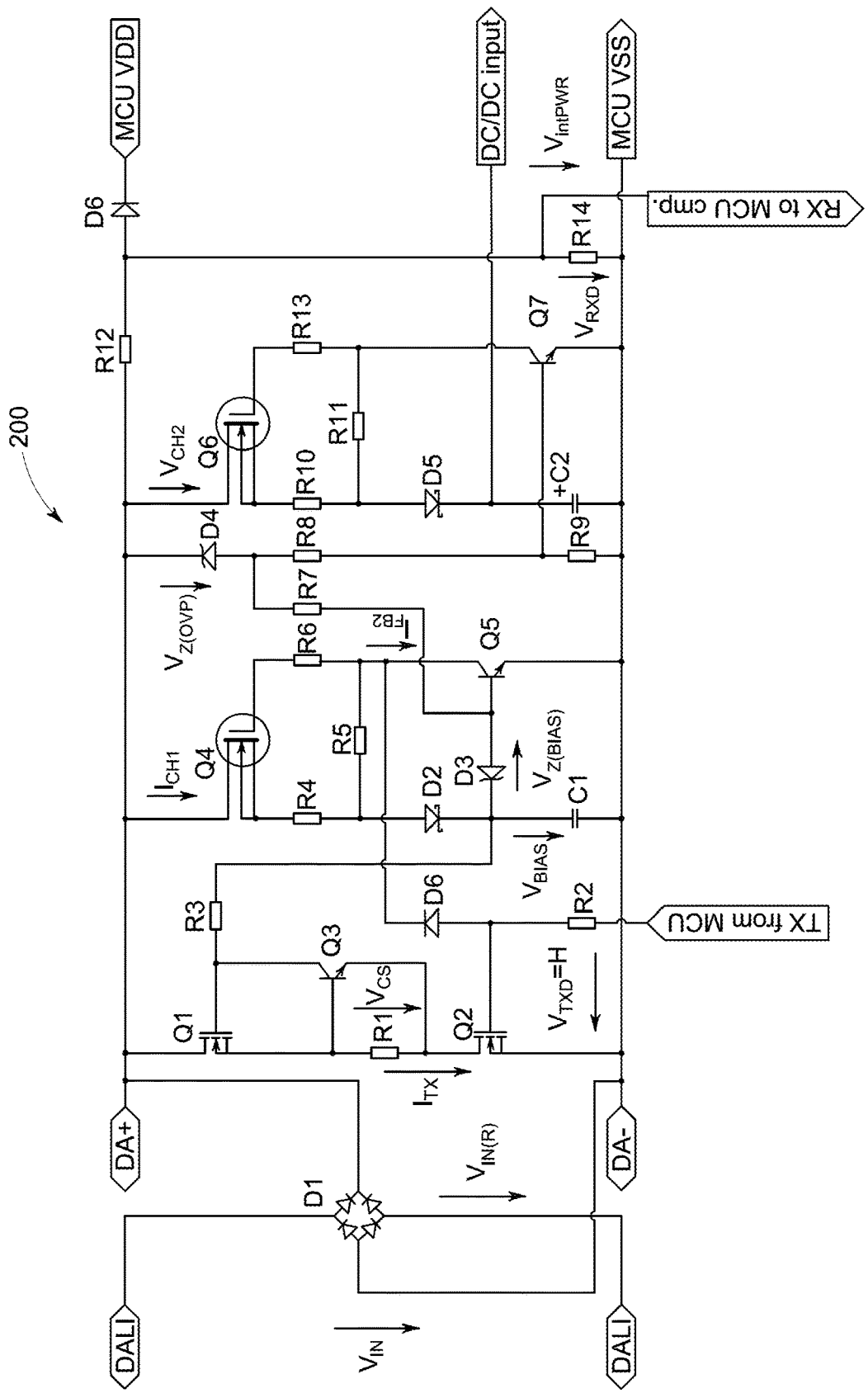
FIG. 3 depicts a schematic of the circuit of FIG. 2 when in a data transmit mode in accordance with embodiments.

Data Transmission:

FIG. 3 schematically depicts data interface/overvoltage protection circuit 200 when in a data transmit mode in accordance with embodiments. When the MCU transmits data, it pulls up its TX output port to logic high level ($V_{TXD}$), driving transistor Q2 logic level low voltage enhancement nMOSFET to be saturated to about $R_{DS(ON)} \leq 100$ mOhm. This saturation pulls down the source electrode of transistor Q1 to return voltage DA−. Transistor Q1 enhanced nMOSFET is biased from capacitor C1 in such a way that it can reliably be driven saturated to about $R_{DS(ON)} \leq 1$ Ohm at nominal bus transmit currents $I_{TX}$ (about 250 milliamps in a DALI system) by pulling its source to return voltage DA−. As a result, the rectified data bus lines will be short circuited by about a 1 Ohm resistance as the series connected saturated channel resistances of transistors Q1, Q2 are in parallel connection with voltages DA+, DA− terminals. Current limiting transistor Q3 remains cut off, as the voltage drop caused by the nominal transmit current, is below its $V_{BE}$ forward threshold.

During transmission this virtual short-circuiting and releasing phases follow each other according to a predetermined timing scheme causing the rectified bus voltage to change between its nominal voltage and practically zero, periodically. In the short-circuited phases there are no capacitor charging currents ($I_{CH1}=0$, $I_{CH2}=0$) so the power needs of the device's data transmitter and controller circuitry must be fed by the energy stored in capacitors C1, C2, accordingly. The time constants of these energy storage elements are designed to be beyond the bus data transmission times which ensures stable operation.

Figure 4:
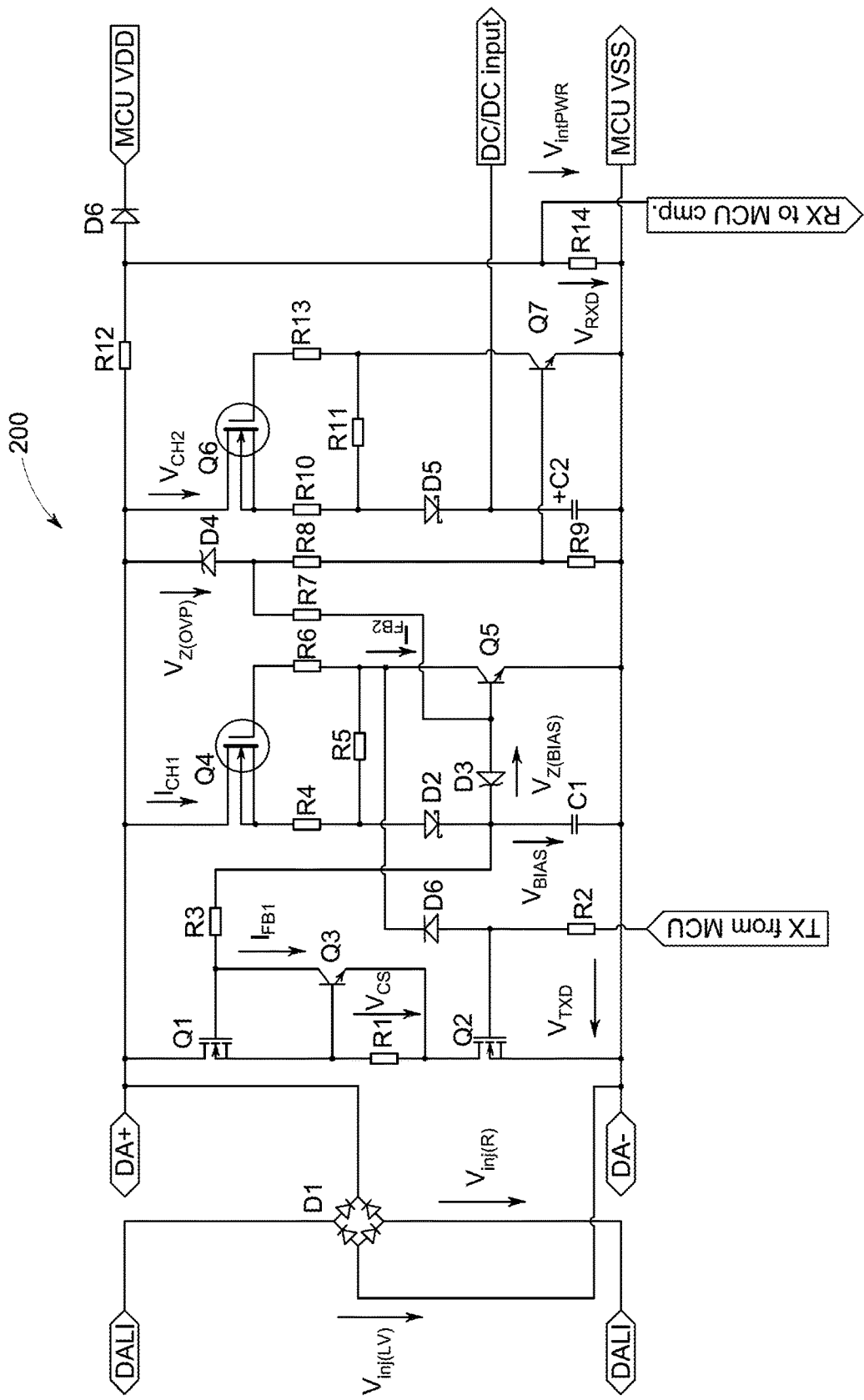
FIG. 4 depicts a schematic of the circuit of FIG. 2 when in a first level overload protection mode in accordance with embodiments.

Overload Protection Level 1:

FIG. 4 schematically depicts data interface/overvoltage protection circuit 200 when in a first level overload protection mode in accordance with embodiments. There can be installation configurations (e.g., installation in a common rack unit shared with other building management system elements) in which the 12V or 24V AC or DC control voltages can inadvertently connect to the control data bus ($V_{inj(LV)}$). These control voltages are below the predefined, DALI specified overvoltage protection limit ($V_{Z(OVP)}$— about approximately 30 VDC or 30 VAC peak) and the overvoltage protection remains inactive. When the device is transmitting (i.e., transistors Q1, Q2 are virtually short-circuiting the control data bus), the current flowing through them starts to rise beyond the nominal transmit current. At a current above the nominal transmit current, the voltage drop on current sense resistor R1 reaches the $V_{BE}$ forward threshold of transistor Q3. Negative feedback current $I_{FB1}$ then starts to flow forcing the gate bias voltage of transistor Q1 to fall until its drain current decreases to a safe level in spite of transistor Q2 still being driven to saturation.

Figure 5:
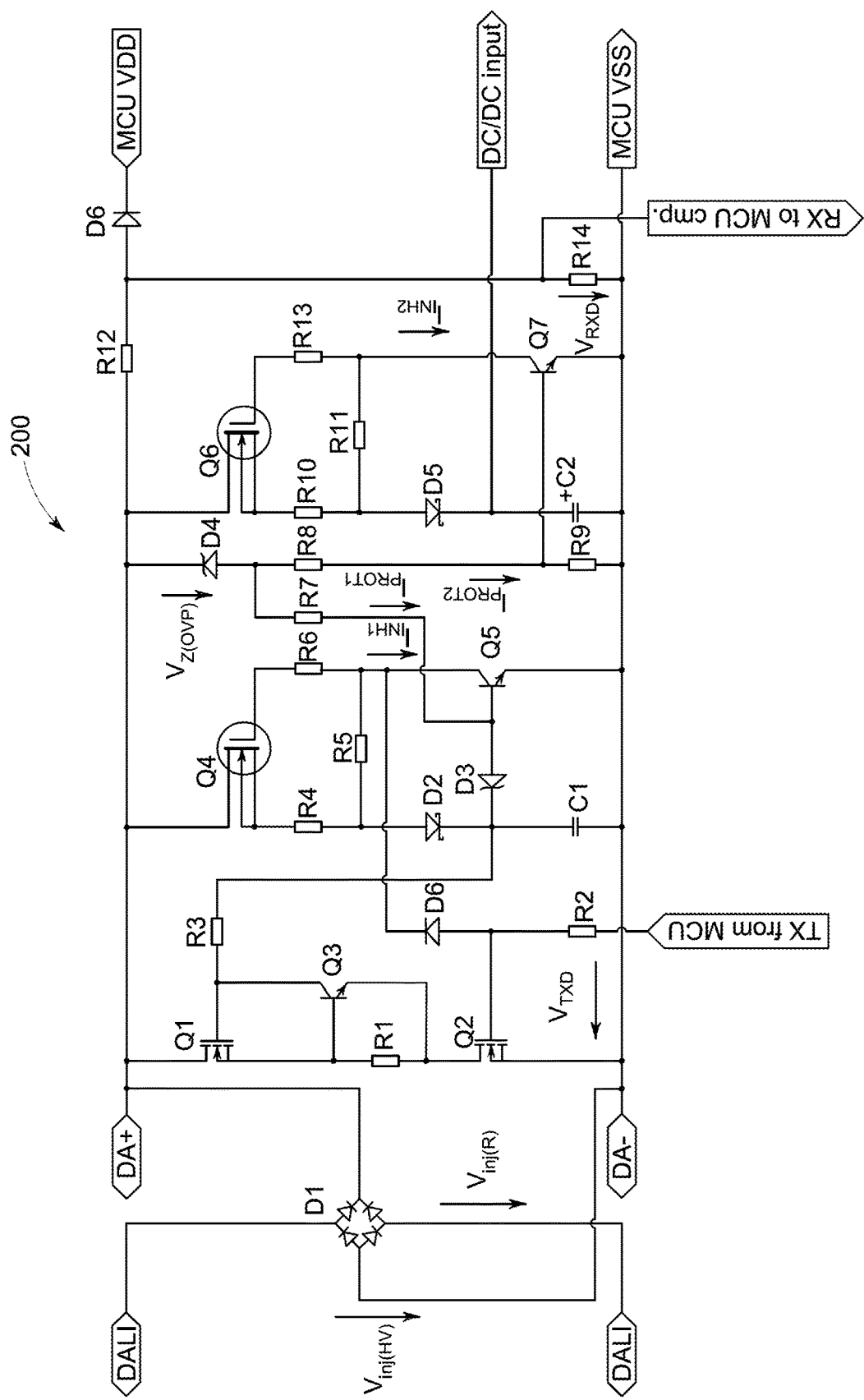
FIG. 5 depicts a schematic of the circuit of FIG. 2 when in a second level overload protection mode in accordance with embodiments.

Overload Protection Level 2:

FIG. 5 schematically depicts data interface/overvoltage protection circuit 200 when in a second level overload protection mode in accordance with embodiments. The DALI standard allows for the common wiring and/or cabling of the control bus and lighting main voltage power supply lines. Overvoltage conditions in the main voltage range $V_{inj(HV)}$ (e.g., about 120 VAC, and/or 240 VAC) caused by miswiring during installation and/or repair can occur. In such a condition, the rectified disturbance voltage $V_{inj(R)}$ exceeds the overvoltage protection limit $V_{Z(OVP)}$ causing protection currents $I_{PROT1}$, $I_{PROT2}$ to flow. These increasing protection currents drive transistors Q5, Q7 to start sinking inhibit currents $I_{INH1}$, $I_{INH2}$ from the gate biasing circuitry of transistors Q4, Q6 current sources, and clamps transistor Q2 gate drive voltage reaching the predetermined overvoltage level.

While the overvoltage condition persists the active elements of the transmitter and the internal power supplies are inhibited so the device ceases working and remains entirely inactive. After the control bus voltage is normalized the device starts working again, similar to the powering-up situation—i.e., the internal power supply voltages build up and the device initializes again.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A data interface with overvoltage protection circuitry, the data interface comprising:
   a bus interface and power rectification stage configured to provide supply and return voltages for the data interface and overvoltage protection circuitry;
   a first power level overvoltage protection circuit configured to provide protection from high-current overvoltages on the DALI bus;
   a second power level overvoltage protection circuit configured to provide protection from overvoltage conditions caused by power main voltages present on the DALI bus;
   the first power level overvoltage protection circuit in parallel connection with the second power level overvoltage protection circuit across lines for the supply and return voltage;
   a digital addressable lighting interface (DALI) endpoint power output port;

a power supply for a DALI endpoint device drawing current from the power output port;

a receiver configured to receive signals on the DALI bus; and a transmitter configured to send signals on the DALI bus.

2. The data interface of claim 1, including the bus interface configured to connect to a two-wire DALI data/control bus.

3. The data interface of claim 1, including the power rectification stage including a diode bridge.

4. The data interface of claim 1, including a receive port connected to a transmit output port of a microcontroller.

5. The data interface of claim 1, including a transmit port connected to a data input port of a microcontroller.

6. The data interface of claim 1, wherein the high-current overvoltages are caused by a current above a nominal transmit current.

7. A data interface with overvoltage protection circuitry, the data interface comprising:

a bus interface configured to be connectable to a digital addressable lighting interface (DALI) bus;

a first power level overvoltage protection circuit connected to a supply voltage line and a return voltage line, wherein the first power level overvoltage protection circuit is configured to protect the data interface from one or more DALI control voltages present on a DALI data bus;

a second power level overvoltage protection circuit connected in parallel with the first power level overvoltage protection circuit across the supply voltage and the return voltage lines;

a DALI endpoint power output port configured to provide a supply voltage to a DALI endpoint device;

a receiver configured to receive signals on the DALI bus; and a transmitter configured to send signals on the DALI bus.

8. The data interface of claim 7, including a power rectification stage configured to rectify a supply voltage received from the DALI bus.

9. The data interface of claim 7, including:

a receive port connected to a transmit output port of a microcontroller; and a transmit port connected to a data input port of a microcontroller.

10. The data interface of claim 7, including:

a DALI transmitter connected to the DALI bus;

a power rectification stage configured to rectify a supply voltage received from the DALI bus;

the DALI transmitter and the power rectification stage each configured to be inhibited by activation of the first power level overvoltage protection circuit; and the DALI transmitter and the power rectification stage each configured to be initialized by de-activation of the first power level overvoltage protection circuit following a removal of the one or more DALI control voltages present on the DALI data bus.

11. The data interface of claim 7, including the second power level overvoltage protection circuit configured to protect the data interface from one or more overvoltage conditions on a main supply line.

12. The data interface of claim 11, including:

a DALI transmitter connected to the DALI bus;

a power rectification stage configured to rectify a supply voltage received from the DALI bus;

the DALI transmitter and the power rectification stage each configured to be inhibited by activation of the second power level overvoltage protection circuit; and the DALI transmitter and the power rectification stage each configured to be initialized by de-activation of the second power level overvoltage protection circuit following an end of the one or more overvoltage conditions.

* * * * *